United States Patent [19]

Yokobori et al.

[11] Patent Number: 4,847,105

[45] Date of Patent: Jul. 11, 1989

[54] A BLOOMING RESISTANT CHOCOLATE

[75] Inventors: Hideo Yokobori; Kazuo Itagaki; Shouji Maruzeni; Nozomi Yasuda, all of Tokyo, Japan

[73] Assignee: Asahi Denka Kogyo Kabushiki Kaisha, Tokyo, Japan

[21] Appl. No.: 18,607

[22] Filed: Feb. 25, 1987

[51] Int. Cl.$^4$ .............................................. A23G 1/00
[52] U.S. Cl. ................................... 426/607; 426/611; 426/631; 426/660
[58] Field of Search ................ 426/607, 611, 631, 660

[56] References Cited

U.S. PATENT DOCUMENTS 4,061,798 12/1977 Kanegae et al. .................... 426/607
4,524,086 6/1985 Player et al. ......................... 426/607

FOREIGN PATENT DOCUMENTS 40745 2/1986 Japan .
181339 8/1986 Japan .
104547 5/1987 Japan .
118848 5/1987 Japan .

Primary Examiner—Doanld E. Czaja
Assistant Examiner—Celine T. Callahan
Attorney, Agent, or Firm—Frishauf, Holtz, Goodman & Woodward

[57] ABSTRACT

A hard butter of the present invention is obtained by adding 0.05 to 20% by weight of polyglycerol fatty acid ester(s), which is prepared by binding four or more moles in average of fatty acid(s) to polyglycerol(s) having five or more in average of hydroxyl groups, to a hard butter. With the use of the hard butter of the present invention, the anti-blooming properties of a chocolate are enhanced with little limitation on the composition of the same. In particular, chocolates containing trans and lauric hard butters can be more freely compounded thereby than in the case of conventional ones.

6 Claims, No Drawings

A BLOOMING RESISTANT CHOCOLATE

BACKGROUND OF THE INVENTION

1. Field of the Invention

This invention relates to a hard butter and a chocolate of excellent qualities. More particularly, it relates to a hard butter and a chocolate highly resistant to blooming. That is, the hard butter of the present invention can remarkably enhance the antiblooming properties of chocolates and chocolate products. Thus the chocolate of the present invention which contains said hard butter is made available with a wider range of composition which can hardly be achieved with the use of conventional ones.

2. Description of the Prior Art

Conventional processes for maintaining the gloss of the surface of a chocolate include compounding of various emulsifiers or particular fats and/or oils. However there has been found no remarkable effect obtained by using any emulsifiers. On the other hand, the compounding of particular fats and/or oils and the elevation of the melting points of fats and/or oils, as described above, are somewhat effective in maintaining the gloss of the surface of a chocolate, i.e., in improving the anti-blooming properties thereof. However these processes highly restrict the composition of products, since it is required to compound a large amount of fats and/or oils in order to maintain the gloss of the surface of the products.

Further the composition of chocolate products is frequently limited from the viewpoint of the antiblooming properties. It is particularly difficult to freely compound those containing trans and lauric hard butters. Namely, it is extremely difficult to compound conventional trans hard butter in a chocolate less than 85% by weight based on the total oleaginous components thereof except milk fat. Namely, it is extremely difficult to compound more than 15% by weight of cacao butter thereto based on the total oleaginous components thereof except milk fat. Fat blooming would readily occur in the case of a product wherein cacao butter is used in an amount exceeding the above value, which damages the commercial value thereof. Further it is extremely difficult to compound conventional lauric hard butter in a chocolate less than 95% by weight based on the total oleaginous components thereof except milk fat. That is, it is extremely difficult to compound more than 5% by weight of cacao butter thereto based on the total oleaginous components thereof except milk fat. Thus conventional chocolate products usually contain 4% by weight or less of cacao butter. Fat blooming would readily occur in the case of a product wherein cacao butter is used in an amount exceeding the above value, which damages the commercial value thereof.

SUMMARY OF THE INVENTION

Under these circumstances, we have attempted to overcome the above-mentioned problems. As a result, we have found that the use of a hard butter containing a particular polyglycerol fatty acid ester(s) makes it possible to maintain the gloss of the surface of a chocolate for a prolonged period of time, i.e., to enhance the anti-blooming properties thereof; and to more freely compound cocoa fractions than in the case of conventional ones, in particular, in the case of chocolates made from trans and lauric hard butters; thus, completing the present invention.

Accordingly the hard butter of the present invention is characterized by containing 0.05 to 20% by weight of polyglycerol fatty acid ester(s) wherein four to more moles in average, preferably six or more moles in average, of fatty acid(s) are bound to polyglycerol(s) having five or more in average, preferably seven or more in average, of hydroxyl groups.

The chocolate of the present invention is characterized by containing said hard butter.

DETAILED DESCRIPTION OF THE PRESENT INVENTION

Now the hard butter and chocolate of the present invention will be described in detail.

Examples of the fatty acid constituting the polyglycerol fatty acid esters contained in the hard butter of the present invention are saturated or unsaturated fatty acids having up to 24 carbon atoms, citric acid, tartaric acid, succinic acid, malic acid or lactic acid.

The polyglycerol fatty acid esters contained in the hard butter of the present invention are those wherein four or more moles in average, preferably from five to ten moles in average, of the above fatty acid(s) are bound to polyglycerol(s) having five or more hydroxyl groups in average. It is further preferable that six or more moles in average, still preferably seven or more moles in average, of the fatty acid(s) are bound to the polyglycerol(s) having seven or more hydroxyl groups in average. It is preferable that number of hydroxyl groups of polyglycerol is to about nine. It is also preferred that all hydroxyl groups of polyglycerol are esterified.

The polyglycerol fatty acid esters may be introduced into the hard butter in an amount of 0.05 to 20% by weight, preferably 0.2 to 10% by weight.

The hard butter of the present invention preferably has a solid fat content (SFC) of 25 or above, still preferably 30 or above, at 30° C. Normally, it is preferable that SFC at 30° C. is about 70 or less.

In the present invention, the SFC may be determined in a conventional manner according to A.O.C.S. Recommended Practice Cd 16-81 Solid Fat Content with the use of a PRAXIS MODEL SFC-900. When determining the SFC of a tempered hard butter according to the abovementioned method, the fats and oils contained therein are completely liquefied and allowed to stand at 0° C. for 30 minutes to thereby solidify the same, then at 20° C. for two hours. Then allowed to stand at 30° C. for one hour, and at 20° C. for two hours. These procedures are repeated seven times. On the other hand, when determining the SFC of a nontempered hard butter such as a trans or lauric one, the fats and oils contained therein are completely liquefied and allowed to stand at 0° C. for 30 minutes to thereby solidify the same, and then at 25° C. for 30 minutes.

The tempered hard butter as described above means those containing triglyceride(s) having a symmetric structure similar to that of cacao butter, while the trans hard butter means those prepared by compounding one or more oils selected from among soybean, rapeseed, sunflower, cotton seed, rice bran, safflower and soft palm oils and necessarily hardening the obtained mixture followed by fractionation if required. The lauric hard butter means those prepared by hardening and/or fractionating fats and/or oils containing a large amount of lauric acid, such as coconut, palm kernel or babassu oil.

The hard butter of the present invention, which can be obtained by incorporating the abovementioned polyglycerol fatty acid ester(s) in an amount within the range as defined above into various hard butters, exhibits an excellent effect. In particular, those obtained by incorporating the abovementioned polyglycerol fatty acid ester(s) into trans and lauric hard butters exhibit remarkable effects of improving the anti-blooming properties of chocolates and chocolate products.

Now the chocolate of the present invention containing the abovementioned hard butter of the present invention will be described.

In the chocolate of the present invention wherein the hard butter of the present invention obtained from a trans hard butter is used, the content of said hard butter is 60% by weight or above, preferably 70 to 85% by weight, based on the total oleaginous components contained therein except milk fat.

In the chocolate of the present invention wherein the hard butter of the present invention obtained from a lauric hard butter is used, the content of said lauric hard butter is 80% by weight or above, preferably 85 to 95% by weight, based on the total oleaginous components contained therein except milk fat.

The chocolate of the present invention containing a trans or lauric hard butter in an amount within the range as defined above, exceeding conventionally employed composition ratios, shows a better taste than a conventional one corresponding thereto.

The hard butter and chocolate of the present invention may further contain either lecithin or condensed ricinoleate of polyglycerol or both of them as well as, for example, acetic monoglyceride, lactic monoglyceride, citric monoglyceride, diacetyltartaric monoglyceride, tartaric monoglyceride, succinic monoglyceride or maleic monoglyceride.

To further illustrate the present invention, and not by way of limitation, the following Examples will be given.

EXAMPLES 1 TO 5 AND COMPARATIVE EXAMPLES 1 TO 3

40% by weight of rice bran oil of an iodine value of 107.1 and 60% by weight of palm soft oil of an iodine value of 69.8 were subjected to selective isomerizing hydrogenation in the presence of 0.5% by weight of sulfur-poisoned nickel catalyst, which contained 7% by weight of sulfur based on nickel, at 200 to 210° C. in a hydrogen stream under atmospheric pressure to thereby give a hardened oil of a melting point of 34.0° C. From the obtained hardened oil, a medium-melting fraction was obtained by removing high- and low-melting fractions by conventional solvent fractionation with the use of n-hexane. This medium-melting fraction was refined in a conventional manner. Thus a trans hard butter of the SFC as shown in the following Table 1 was obtained.

TABLE 1

| SFC of trans hard butter | |
| --- | --- |
| Temperature | SFC |
| 10° C. | over |
| 20° C. | 88.0 |
| 25° C. | 82.2 |
| 30° C. | 60.1 |
| 35° C. | 26.3 |
| 37° C. | 10.7 |

TABLE 1-continued

| SFC of trans hard butter | |
| --- | --- |
| Temperature | SFC |
| 40° C. | 0.3 |

To the above trans hard butter, 2.8% by weight of each polyglycerol fatty acid ester as shown in Table 2 was added. Thus trans hard butters of the present invention (Examples 1 to 5) and Comparative hard butters (Comparative Examples 1 to 3) corresponding thereto were obtained. The following Table 2 shown the SFC of each trans hard butter at 30° C.

TABLE 2

| | Polyglycerol fatty ester and SFC of hard butter obtained by adding the same (30° C.) | | |
| --- | --- | --- | --- |
| | No. of hydroxyl groups of polyglycerol per mole | Moles of added stearic acid per mole | SFC (30° C.) |
| Ex. 1 | 7 | 5 | 60.2 |
| Ex. 2 | 7 | 7 | 59.7 |
| Ex. 3 | 9 | 5 | 59.9 |
| Ex. 4 | 9 | 7 | 60.0 |
| Ex. 5 | 9 | 9 | 60.3 |
| C. Ex. 1 | control (no addition) | — | 61.0 |
| C. Ex. 2 | 5 | 2 | 59.5 |
| C. Ex. 3 | 7 | 2 | 59.8 |

Subsequently a chocolate, which contained each trans hard butter thus obtained and had the composition as shown in Table 3, was prepared in a conventional manner.

TABLE 3

| Composition of trans chocolate | | |
| --- | --- | --- |
| | (parts by weight) | |
| sugar | 44.0 | |
| nonskimmed milk powder (containing 25% of oleaginous components) | 5.0 | |
| skim milk powder | 10.0 | |
| cacao mass (containing 55% of oleaginous components) | 8.0 | |
| cacao powder (containing 23% of oleaginous components) | 8.0 | |
| cacao butter | 3.0 | |
| hard butter | 22.0 | |
| lecithin | 0.4 | |
| vanillin | 0.04 | |
| total cacao components | 26.0 | |
| total oleaginous components | 32.5 | (100.0%) |
| milk fat | 1.3 | (4.0%) |
| cacao butter | 9.2 | (28.3%) |
| hard butter | 22.0 | (67.7%) |
| oleaginous components except milk fat | 31.2 | (100.0%) |
| cacao butter | 9.2 | (29.5%) |
| hard butter | 22.0 | (70.5%) |

Each obtained chocolate was allowed to stand at room temperature and the glossness of the surface, i.e., the degree of fat blooming was examined with the lapse of time. Table 4 shows the results.

TABLE 4

| Changes in the glossiness of the surface with time | | | | |
| --- | --- | --- | --- | --- |
| | Initiation | 3 months | 6 months | 9 months |
| Ex. 1 | ◯ | ◯ | ◯ | X |
| Ex. 2 | ◯ | ◯ | ◯ | ◯ |
| Ex. 3 | ◯ | ◯ | ◯ | △ |
| Ex. 4 | ◯ | ◯ | ◯ | ◯ |
| Ex. 5 | ◯ | ◯ | ◯ | ◯ |

TABLE 4-continued

| | Changes in the glossiness of the surface with time | | | |
|---|---|---|---|---|
| | Initiation | 3 months | 6 months | 9 months |
| C. Ex. 1 | ◉ | Δ | X | XX |
| C. Ex. 2 | ◉ | Δ | X | XX |
| C. Ex. 3 | ◉ | Δ | X | XX |

Evaluation:
◉: very good;
◯: good;
Δ: somewhat poor;
X: poor; and
XX: very poor.

EXAMPLES 6 TO 10 AND COMPARATIVE EXAMPLES 4 TO 6

The low melting fraction of palm kernel oil of an iodine value of 16.2 was removed through conventional solvent fractionation with the use of n-hexane to thereby give the high-melting fraction. The fraction was hardened as highly as possible and refined in a conventional manner to thereby give a lauric hard butter having SFC as shown in the following Table 5.

TABLE 5

| SFC of lauric hard butter | |
|---|---|
| Temperature | SFC |
| 20° C. | over |
| 25° C. | 87.6 |
| 30° C. | 55.2 |
| 35° C. | 7.2 |
| 37° C. | 2.8 |
| 40° C. | 0.0 |

To the lauric hard butter as described above, 2.8% by weight of each polyglycerol fatty acid ester as shown in the following Table 6 was added. Thus lauric hard butters of the present invention (Examples 6 to 10) and those corresponding thereto (Comparative Examples 4 to 6) were obtained. The following Table 6 shows the SFC's of these lauric hard butters at 30° C.

TABLE 6

| Polyglycerol fatty acid ester and SFC of hard butter obtained by adding the same (30° C.) | | | |
|---|---|---|---|
| | No. of hydroxyl groups of polyglycerol per mole | Moles of added stearic acid per mole | SFC (30° C.) |
| Ex. 6 | 5 | 5 | 55.8 |
| Ex. 7 | 7 | 5 | 55.0 |
| Ex. 8 | 7 | 7 | 54.5 |
| Ex. 9 | 9 | 7 | 54.7 |
| Ex. 10 | 9 | 9 | 55.6 |
| C. Ex. 4 | control (no addition) | — | 55.2 |
| C. Ex. 5 | 5 | 2 | 54.3 |
| C. Ex. 6 | 7 | 2 | 54.9 |

Subsequently a chocolate, which contained each lauric hard butter thus obtained and had the composition as shown in the following Table 7, was prepared in a conventional manner.

TABLE 7

| Composition of lauric chocolate | |
|---|---|
| | (parts by weight) |
| sugar | 48.4 |
| cacao mass (containing 55% of oleaginous components) | 5.0 |
| cacao powder (containing 13% of oleaginous components) | 10.1 |
| hard butter | 36.5 |
| lecithin | 0.4 |

TABLE 7-continued

| Composition of lauric chocolate | | |
|---|---|---|
| | (parts by weight) | |
| vanillin | 0.04 | |
| total cacao components | 15.1 | |
| total oleaginous components | 40.6 | (100.0%) |
| cacao butter | 4.1 | (10.0%) |
| hard butter | 36.5 | (90.0%) |

Each chocolate thus obtained was allowed to stand at room temperature and the glossiness of the surface of the same, i.e., the degree of fat blooming with the lapse of time was examined. The following Table 8 shows the results.

TABLE 8

| | Changes in the glossiness of the surface with time | | |
|---|---|---|---|
| | Initiation | 2 months | 4 months |
| Ex. 6 | ◉ | ◉ | ◯ |
| Ex. 7 | ◉ | ◉ | ◉ |
| Ex. 8 | ◉ | ◉ | ◯ |
| Ex. 9 | ◉ | ◉ | ◉ |
| Ex. 10 | ◉ | ◉ | ◯ |
| C. Ex. 4 | ◉ | X | XX |
| C. Ex. 5 | ◉ | X | XX |
| C. Ex. 6 | ◉ | X | XX |

Evaluation:
◉: very good;
◯: good;
Δ: somewhat poor;
X: poor; and
XX: very poor.

EXAMPLE 11 AND COMPARATIVE EXAMPLE 7

To the tempered hard butter having the SFC as shown in the following Table 9, 2.5% by weight of the same polyglycerol fatty acid ester as the one used in Example 2 was added to give a tempered hard butter of the present invention. The SFC of this tempered hard butter at 30° C. was 34.3.

TABLE 9

| SFC of tempered hard butter | |
|---|---|
| Temperature | SFC |
| 10° C. | over |
| 20° C. | 75.2 |
| 25° C. | 64.4 |
| 30° C. | 36.0 |
| 33° C. | 6.5 |
| 35° C. | 2.4 |
| 37° C. | 2.0 |
| 40° C. | 0.0 |

Subsequently two tempered chocolates, one containing the tempered hard butter thus obtained while the other containing the tempered hard butter having the SFC as shown in the above Table 9 without any polyglycerol fatty acid ester, were prepared according to the composition as shown in the following Table 10.

TABLE 10

| Composition of tempered chocolate | |
|---|---|
| | (parts by weight) |
| sugar | 44.0 |
| nonskimmed powder milk (containing 25% of oleaginous components) | 18.0 |
| cacao mass (containing 55% of oleaginous components) | 18.0 |
| cacao butter | 8.5 |
| hard butter | 10.6 |
| total cacao components | 26.5 |

TABLE 10-continued

| Composition of tempered chocolate | | |
|---|---|---|
| | (parts by weight) | |
| total oleaginous components | 33.5 | (100.0%) |
| milk fat | 4.5 | (13.4%) |
| cacao butter | 18.4 | (54.9%) |
| hard butter | 10.6 | (31.6%) |
| oleaginous components except milk fat | 29.0 | (100.0%) |
| cacao butter | 18.4 | (63.4%) |
| hard butter | 10.6 | (36.6%) |

Each chocolate thus obtained was allowed to stand at room temperature and the glossiness of the surface of the same, i.e., the degree of fat blooming was examined with the lapse of time. The following Table 11 shows the results.

TABLE 11

| Changes in the glossiness of surface with time | | | | |
|---|---|---|---|---|
| | Initiation | 3 months | 6 months | 9 months |
| Ex. 11 | O | O | O | O |
| C. Ex. 7 | O | O | O | Δ |

With the use of the hard butter of the present invention, the anti-blooming properties of a chocolate are enhanced with little limitation on the composition of the same. In particular, chocolates containing trans and lauric hard butters can be more freely compounded thereby cocoa fraction or cocoa butter than in the case of conventional ones.

EXAMPLE 12

To the tempered hard butter having the SFC as shown in the above Table 9, 2.5% by weight of the following polyglycerol fatty acid ester was added to give a tempered hard butter of the present invention. The SFC of this tempered hard butter at 30° C. was 34.0.

[Polyglycerol fatty acid ester]
No. of hydroxyl groups of polyglycerol per mole ... 9

Moles of added fatty acid per mole ... 9
Proportion of composition of fatty acid is as follows.
Stearic acid : Erucic acid=50:50

Subsequently a tempered chocolate containing the tempered hard butter thus obtained was prepared according to the composition as shown in the above Table 10.

The chocolate thus obtained was allowed to stand at room temperature and the glossiness of the surface of the same, i.e., the degree of fat blooming was examined with the lapse of time. The following Table 12 shows the results.

TABLE 12

| Changes in the glossiness of surface with time | | | | |
|---|---|---|---|---|
| | Initiation | 3 months | 6 months | 9 months |
| Ex. 12 | O | O | O | O |

What is claimed is:

1. A blooming resistant chocolate comprising cocoa butter and trans hard butter containing polyglycerol fatty acid ester(s), wherein said cocoa butter is present in an amount of 15 to 40% by weight based on the total of cocoa butter and trans hard butter, said trans hard butter is present in an amount of 60 to 85% by weight based on the total of cocoa butter and trans hard butter, and said trans hard butter contains 0.05 to 20% by weight of polyglycerol fatty acid ester(s) prepared by binding an average of four or more moles of fatty acid(s) to polyglycerols having an average of five or more hydroxyl groups.

2. The chocolate as set forth in claim 1, wherein said polyglycerol(s) have nine or more in average of hydroxyl groups.

3. The chocolate as set forth in claim 1, wherein the trans hard butter shows a solid fat content of 25 or more at 30° C.

4. The chocolate as set forth in claim 1, wherein the trans hard butter shows a solid fat content of 30 or more at 30° C.

5. The chocolate as set forth in claim 1, comprising said trans hard butter in an amount of 60% and said cocoa butter in an amount of 40% by weight based on the total of cocoa butter and trans hard butter.

6. The chocolate as set forth in claim 1, comprising said trans hard butter in an amount of 70 to 85% and said cocoa butter in an amount of 15 to 30% by weight based on the total of cocoa butter and trans hard butter.

* * * * *